US010260371B2

(12) United States Patent
Youssef et al.

(10) Patent No.: US 10,260,371 B2
(45) Date of Patent: Apr. 16, 2019

(54) METHOD AND ASSEMBLY FOR PROVIDING AN ANTI-ICING AIRFLOW

(71) Applicant: Pratt & Whitney Canada Corp., Longueuil (CA)

(72) Inventors: Nashed Youssef, Mississauga (CA); Andreas Eleftheriou, Woodbridge (CA); Daniel Alecu, Brampton (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 377 days.

(21) Appl. No.: 15/160,366

(22) Filed: May 20, 2016

(65) Prior Publication Data

US 2017/0335715 A1    Nov. 23, 2017

(51) Int. Cl.
| *F01D 25/02* | (2006.01) |
| *B64D 15/04* | (2006.01) |
| *F01D 25/10* | (2006.01) |
| *F01D 25/30* | (2006.01) |
| *F02C 3/04* | (2006.01) |
| *F02C 9/18* | (2006.01) |

(Continued)

(52) U.S. Cl.
CPC .............. *F01D 25/02* (2013.01); *B64D 15/04* (2013.01); *F01D 25/10* (2013.01); *F01D 25/30* (2013.01); *F02C 3/04* (2013.01); *F02C 6/08* (2013.01); *F02C 7/047* (2013.01); *F02C 9/18* (2013.01); *F05D 2220/323* (2013.01); *F05D 2240/35* (2013.01); *F05D 2260/213* (2013.01); *Y02T 50/675* (2013.01)

(58) Field of Classification Search
CPC ......... F01D 25/02; F01D 25/10; B64D 15/02; B64D 15/04; F02C 7/047; F02C 9/18; F05D 2260/213
See application file for complete search history.

(56) References Cited

U.S. PATENT DOCUMENTS

| 2,563,054 A | 8/1951 | Messinger et al. |
| 2,712,727 A | 7/1955 | Morley et al. |

(Continued)

OTHER PUBLICATIONS

Williams International, Williams International Receives EASA Certification of its FJ44-3AP Turbofan, The power of Vision, May 8, 2012.

*Primary Examiner* — Steven Sutherland
(74) *Attorney, Agent, or Firm* — Norton Rose Fulbright Canada LLP

(57) ABSTRACT

A method for providing an anti-icing airflow, including extracting a compressed airflow from a core flow path of an engine, heating the compressed airflow, mixing the heated compressed airflow with air extracted from a bypass flow path to create the anti-icing airflow having a higher temperature and pressure than that of the air extracted from the bypass flow path, and circulating the anti-icing airflow away from the bypass flow path. Also, an assembly located at least in part inside a turbofan engine and including a heat exchanger, a flow mixing device having a first inlet in the bypass flow path, a second inlet and an outlet, a first conduit providing fluid communication between the heat exchanger and a compressed air portion of the core flow path, a second conduit providing fluid communication between the heat exchanger and the second inlet, and a third conduit in fluid communication with the outlet.

20 Claims, 3 Drawing Sheets

(51) Int. Cl.
*F02C 6/08* (2006.01)
*F02C 7/047* (2006.01)

(56) References Cited

U.S. PATENT DOCUMENTS

| | | | |
|---|---|---|---|
| 4,482,114 A * | 11/1984 | Gupta | B64D 15/02 |
| | | | 244/118.5 |
| 6,305,156 B1 * | 10/2001 | Lui | B64D 13/06 |
| | | | 454/76 |
| 9,109,514 B2 | 8/2015 | Cheong | |
| 10,012,146 B2 * | 7/2018 | Pelagatti | F02C 6/04 |
| 2014/0144124 A1 | 5/2014 | Mazumder et al. | |
| 2015/0291284 A1 | 10/2015 | Victor et al. | |

\* cited by examiner

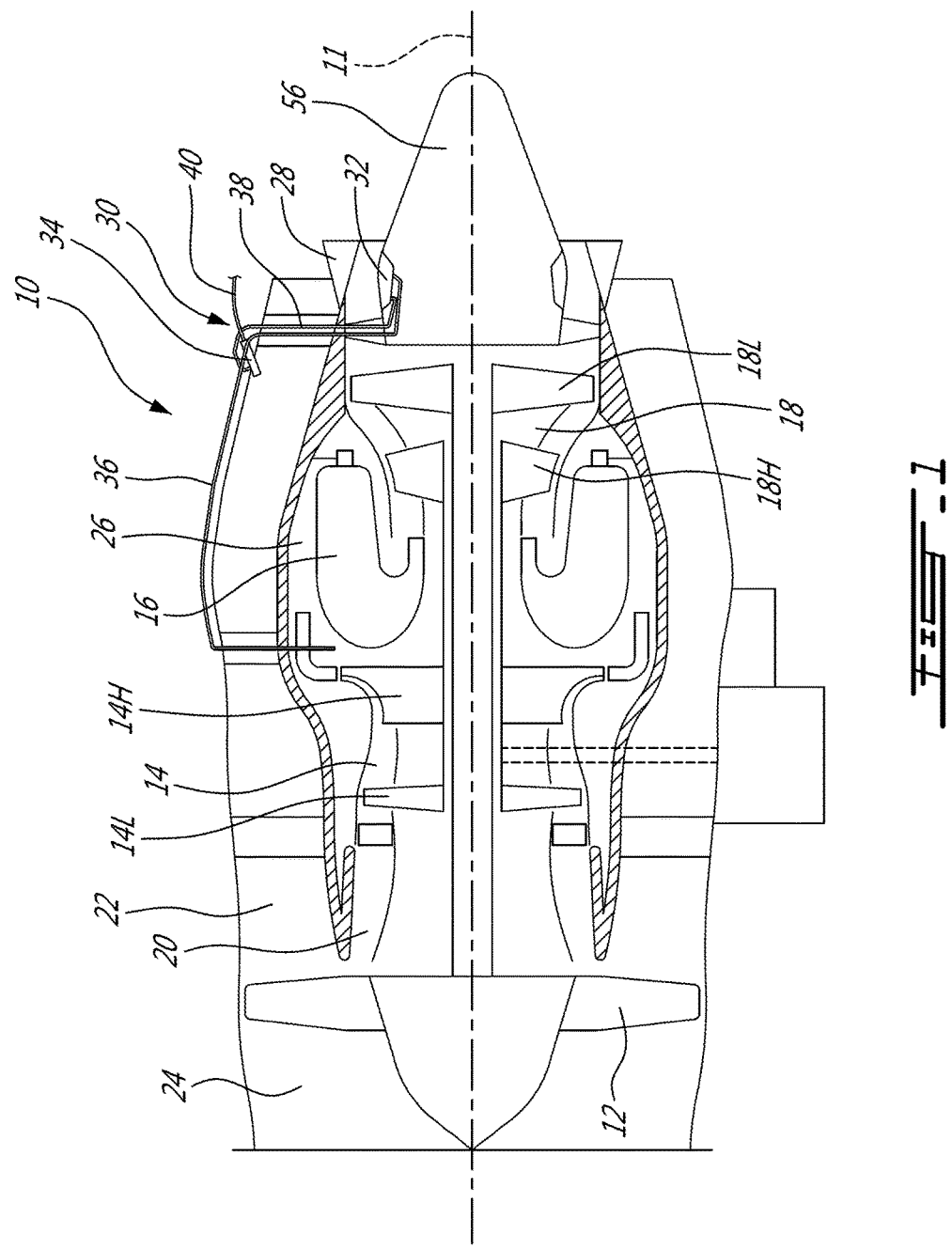

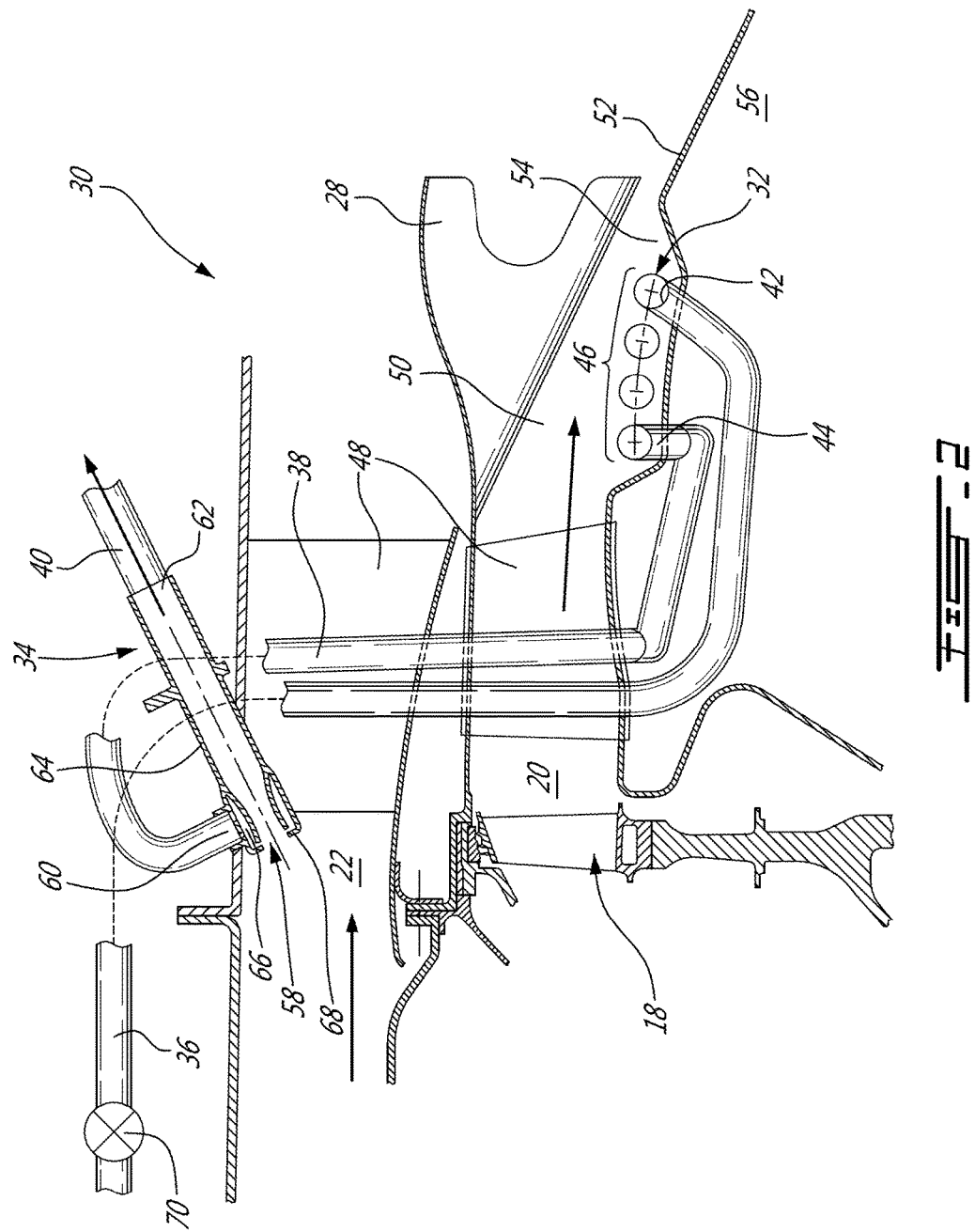

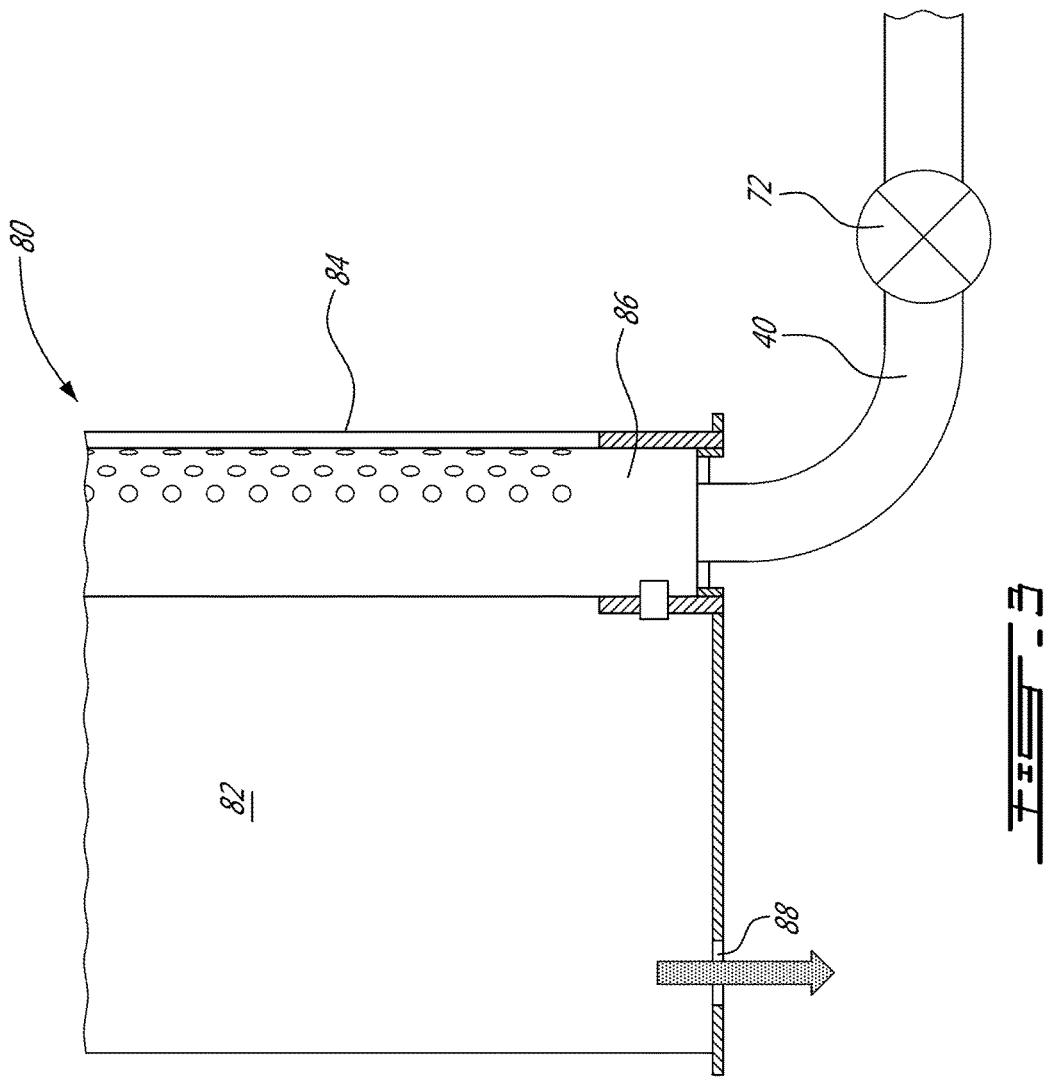

METHOD AND ASSEMBLY FOR PROVIDING AN ANTI-ICING AIRFLOW

TECHNICAL FIELD

The application relates generally to anti-icing airflow and, more particularly, to such airflow provided by a turbofan engine.

BACKGROUND OF THE ART

In gas turbine engines, it is known to use the bleed flow of the compressor section as the main source for anti-icing airflow, for example by modulating a mix between bleed air from low and high pressure portions of the compressor section. Anti-icing systems have minimum pressure and temperature requirements which for some engines can represent a significant part of the available bleed air, which may be detrimental to the other aircraft bleed air uses such as pressurized cabin air. Accordingly, smaller engines are often not adapted to provide anti-icing airflow, and in aircraft using such engines anti-icing is performed through other means, such as expandable bladders provided on the surfaces susceptible to icing. These other systems may represent undesirable costs and/or maintenance requirements.

SUMMARY

In one aspect, there is provided a method for providing an anti-icing airflow to an aircraft anti-icing system, the method comprising: extracting a compressed airflow from a core flow path of a turbofan engine; heating the compressed airflow; mixing the heated compressed airflow with air extracted from a bypass flow path of the engine to create the anti-icing airflow, the anti-icing airflow having a higher temperature and pressure than that of the air extracted from the bypass flow path; and circulating the anti-icing airflow away from the bypass flow path to the aircraft anti-icing system.

In another aspect, there is provided an assembly for providing an anti-icing airflow to an aircraft anti-icing system, the assembly located at least in part inside a turbofan engine, the assembly comprising: a heat exchanger including an inlet, an outlet and a fluid path between the inlet and outlet, the fluid path in heat exchange relationship with a heat source; a flow mixing device having first and second inlets in fluid communication with a same outlet, the first inlet received in a bypass flow path of the turbofan engine; a first conduit providing fluid communication between the inlet of the heat exchanger and a compressed air portion of a core flow path of the turbofan engine; a second conduit providing fluid communication between the outlet of the heat exchanger and the second inlet of the flow mixing device; and a third conduit in fluid communication with the outlet of the flow mixing device for providing the anti-icing airflow to an aircraft anti-icing system.

In a further aspect, there is provided a turbofan engine for an aircraft, the engine comprising: an annular core flow path and an annular bypass flow path defined around the core flow path; a combustor plenum containing a combustor, the combustor plenum in fluid communication with a downstream end of a compressor section of the core flow path; a heat exchanger including an inlet, an outlet and a fluid path between the inlet and outlet, the fluid path in heat exchange relationship with a heat source; a flow mixing device having first and second inlets in fluid communication with a same outlet, the first inlet in fluid communication with the bypass flow path; a first conduit providing fluid communication between the combustor plenum and the inlet of the heat exchanger; a second conduit providing fluid communication between the outlet of the heat exchanger and the second inlet of the flow mixing device; and a third conduit in fluid communication with the outlet of the flow mixing device for circulating a flow from the flow mixing device to an anti-icing system of the aircraft.

DESCRIPTION OF THE DRAWINGS

Reference is now made to the accompanying figures in which:

FIG. 1 is a schematic cross-sectional view of a gas turbine engine;

FIG. 2 is a schematic cross-sectional view of an assembly for providing an anti-icing airflow of the engine of FIG. 1, in accordance with a particular embodiment; and FIG. 3 is a schematic cross-sectional view of part of an anti-icing system which may be used with the assembly of FIG. 2.

DETAILED DESCRIPTION

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 includes low and high pressure sections, with the low pressure compressor section 14L located upstream of the high pressure compressor section 14H. The turbine section 18 also includes low and high pressure sections, with the low pressure turbine section 18L located downstream of the high pressure turbine section 18H.

The engine 10 includes an annular core flow path 20 and an annular bypass flow path 22 defined around the core flow path 20. The bypass flow path 22 and the core flow path 20 both extend from the downstream end of a common flow path 24, where the fan 12 is received; the fan rotor extends across both the core and bypass flow paths 20, 22. The compressor and turbine sections 14, 18 both include rotors extending across the core flow path 20. The combustor 16 is received in a combustor plenum 26 in communication with the core flow path 20 downstream of the compressor section 14, between the compressor and turbine sections 14, 18. The flows from the core and bypass flow paths 20, 22 are mixed together downstream of the turbine section 18 by an exhaust mixer 28.

The engine 10 includes an assembly 30 for providing an anti-icing airflow to an aircraft anti-icing system (e.g. system for de-icing and/or for the preventing the formation of ice). The assembly 30 is located at least in part inside the engine 10, and generally includes a heat exchanger 32, a flow mixing device 34, a compressed flow conduit 36, a heated flow conduit 38, and an anti-icing flow conduit 40. The assembly 30 allows for compressed air extracted from the core flow path 20 to be heated and then used to increase the pressure and temperature of a low pressure airflow from the bypass flow path 22 to produce an anti-icing airflow having a pressure and temperature sufficient to meet the requirements of an anti-icing system, as will be further detailed below.

Referring to FIG. 2, a particular embodiment of the assembly 30 is shown. The heat exchanger 32 generally includes an inlet 42, an outlet 44 and a fluid path 46 between the inlet and outlet 42, 44; the fluid path 46 may be defined by a single conduit or by a plurality of conduits. The inlet 42 of the heat exchanger 32 is connected to one end of the compressed flow conduit 36, which has its opposed end in fluid communication with the core flow path 20 downstream of at least part of the compressor section 14, to provide fluid communication between the compressed air portion of the core flow path 20 and the heat exchanger 32 through the compressed flow conduit 36. In the embodiment shown in FIG. 1, the compressed flow conduit 36 has its opposed end received in or in communication with the combustor plenum 26, upstream of the combustor 16, such as to extract some of the compressed air provided by the high pressure compressor section 14H. Alternately, the compressed flow conduit 36 may be in communication with another location of the combustor plenum 26, or with the core flow path 20 in the compressor section 14. However, in a particular embodiment, the use of compressed air having a higher pressure allows for increased efficiency of the assembly 30.

Referring back to FIG. 2, in the embodiment shown the compressed flow conduit 36 extends from the combustor plenum 26 across the bypass flow path 22, radially outwardly of the bypass flow path 22, and then radially inwardly across the bypass flow path 22 and core flow path 20 to reach the heat exchanger 32; other configurations are also possible. The compressed flow conduit 36 may cross the flow paths 20, 22 by extending within a strut 48 or other suitable structure.

The fluid path 46 of the heat exchanger 32 is in heat exchange relationship with a heat source. In the embodiment shown, this heat source is an exhaust duct 50 of the turbine section 18. The inner wall 52 of the exhaust duct 50, which in the embodiment shown is defined by an exhaust cone 56 (see FIG. 1) has an annular recessed portion 54 between the turbine section 18 and the exhaust mixer 28. The recessed portion 54 is radially inwardly offset from the adjacent portions of the inner wall 52, and the fluid path 46 is defined by a conduit received in this recessed portion 54 and spiralling around the exhaust cone 56. The exhaust flow circulates in contact with the spiralling conduit and accordingly heats the compressed air circulating therein. Although not shown, fins could be added to the conduit(s) defining the fluid path 46 of the heat exchanger 32 to increase heat transfer. Other configurations and/or heat sources may alternately be used. For example, the fluid path 46 of the heat exchanger 32 may be defined as a plenum in heat exchange relationship with the heat source, e.g. by closing the recessed portion 54 with a wall such as to define the plenum around the exhaust cone 56.

Still referring to FIG. 2, in the embodiment shown, the flow mixing device 34 is an ejector. The ejector 34 includes a first or main inlet 58, a second or motive flow inlet 60, and an outlet 62 in communication with both inlets 58, 60. The main inlet 58 of the ejector 34 is received in the bypass flow path 22, and is oriented so as to face the flow circulating in the bypass flow path 22. In the embodiment shown, the body 64 of the ejector 34 extends out of the outer wall enclosing the bypass flow path 22 (bypass duct wall), so that the outlet 62 is located radially outwardly of the bypass flow path 22; in a particular embodiment and in use, the outlet 62 is located within the engine nacelle. The outlet 62 of the ejector 34 is in fluid communication with, and connected to, the anti-icing flow conduit 40.

The heated flow conduit 38 has one end connected to the outlet 44 of the heat exchanger 32 and an opposed end connected to the motive flow inlet 60, thus providing fluid communication therebetween. In the embodiment shown the heated flow conduit 38 extends from the heat exchanger 32 radially outwardly across the bypass flow path 22 and core flow path 20 to reach the motive flow inlet 60, which is located radially outwardly of the bypass flow path 22; the heated flow conduit 38 may cross the flow paths 20, 22 by extending within the strut 48 or other suitable structure.

It is understood that the fluid path 46 of the heat exchanger 32 may be defined as part of an integrally formed, monolithic conduit together with the heated flow conduit 38 and/or the compressed flow conduit 36, or alternately be defined as separate elements interconnected through any suitable type of connection.

The ejector body 64 is shaped so that the flow penetrating through the motive flow inlet 60, which has a pressure higher than that of the flow penetrating the main inlet 58, provides a driving force driving the flow from the main inlet 58 and increasing its pressure while reducing its velocity so that the flow exiting the outlet 62 has a greater pressure than the flow in the bypass flow path 22 feeding the main inlet 58. The hotter flow entering the motive flow inlet 60 additionally increases the temperature of the flow from the main inlet 58 to create the anti-icing airflow. Through this arrangement, the bypass flow path 22 is the source of a substantial portion, and in a particular embodiment of a major part, of the air for generating the anti-icing airflow.

In the embodiment shown, the ejector 34 is a Coanda ejector, and the body 64 is configured to use the Coanda effect by directing the motive flow through a slot 66 over a lip 68 of the main inlet 58. It is understood that any suitable ejector configuration may alternately be used. As a non-limiting example, the body 64 may define a nozzle at the motive flow inlet 60, and a diffuser throat downstream of both inlets 58, 60.

Although a single ejector is shown in the Figure, it is understood that two or more ejectors may alternately be used, for example supplied by the same compressed flow conduit 36 branching out to connect to the motive flow inlet of each ejector.

It is also understood that other types of flow mixing devices 34 allowing the bypass flow path 22 to be used as anti-icing air source through mixing with the heated compressed air may be used, including, but not limited to, a pump assembly of the turbo-compressor type.

A valve 70 may optionally be provided in the compressed flow conduit 36, upstream of the flow mixing device 34, so that the flow circulating through this conduit 36 may be regulated; for example, when the requirement for anti-icing flow is reduced or non-existent, the flow through the compressed flow conduit 36 may correspondingly be reduced or prevented, which reduces the temperature and pressure of the flow out of the flow mixing device 34. In this case, and if no valve is provided between the flow mixing device 34 and the anti-icing system, flow to the anti-icing system would be maintained, but at a reduced pressure and temperature, as required. When multiple ejectors or flow mixing devices 34 are used, the compressed flow supplied thereto may be controlled by the same valve 70.

In addition or alternatively, a valve 72 (see FIG. 3) may optionally be provided in the anti-icing flow conduit 40, downstream of the flow mixing device 34, so that the flow circulating through this conduit 40 may be regulated; for example, when the requirement for anti-icing flow is reduced or non-existent, the flow through the anti-icing flow conduit 40 and to the anti-icing system may correspondingly be reduced or prevented. In the embodiment shown, partially or completely closing such a valve 72 to reduce or prevent the flow out of the flow mixing device 34 to the anti-icing system would correspondingly cause the flow entering the motive flow inlet 60 to partially or completely flow back through the main inlet 58, thus causing a part or the whole of the mixed flow to rejoin the flow in the bypass flow path 22. The addition of the heated compressed air in the bypass flow path 22 advantageously contributes to the engine thrust, thus in a particular embodiment minimizing the impact of having the compressed air extracted from the core flow.

Accordingly, the assembly 30 can be used without any valves upstream of the flow mixing device 34, for example so that the fluid communication from the combustor plenum 26 to the flow mixing device 34 remains open when the valve 72 of the anti-icing flow conduit 40 is closed. In a particular embodiment, this represents a significant advantage over prior art systems which typically require the use of one or more valve(s) to regulate the air extracted from the core flow.

When provided, the valve(s) 70, 72 may be controlled by pressure, temperature or by a signal from the electronic controller of the engine 10 (not shown).

The assembly 30 is particularly, although not exclusively, suitable for a turbofan engine where the core flow path 20 and the bypass flow path 22 are relatively sized to define a "low" bypass ratio, e.g. a bypass ratio (the ratio between the mass flow rate of air flowing in the bypass flow path 22 to the mass flow rate of air flowing through the core flow path 20) of 4 or less. In a particular embodiment, the assembly 30 is particularly, although not exclusively, suitable for a turbofan engine where the bypass ratio corresponds to any of the following: at least 1.25 and at most 4; at least 1.25 and at most 1.7; at least 1.3 and at most 4; at least 1.3 and at most 1.7; at least 1.35 and at most 4; at least 1.35 and at most 1.7.

Referring to FIG. 3, a non-limiting example of an anti-icing system 80 with which the assembly 30 may be used is schematically shown. The anti-icing system 80 shown is incorporated in a wing 82, adjacent its leading edge 84. A perforated tube 86 extends in the wing 82 adjacent the leading edge 84 to provide impinging jets of hot air on the inner surface of the leading edge 84, and a drain 88 is provided in the wing 82 for circulation of the airflow. The anti-icing flow conduit 40 is in fluid communication with the perforated tube 86 to provide the hot air flow for this impingent heating.

In a particular embodiment, the flow in the anti-icing flow conduit 40 has a pressure sufficient to allow for an expansion ratio of 1.6 or more in the tube perforations, and the temperature of the flow in the anti-icing flow conduit 40 is at least above the water boiling point. In flight, the ram pressure due to the flight speed and the engine fan compression ratio provide a flow pressure in the bypass flow path 22 which is close to the requirement of the anti-ice system 80 even at relatively low engine powers, and the fluid mixing device(s) 34 (e.g. ejector(s)) increases that pressure to meet the requirement of the anti-ice system 80.

In a particular embodiment, the flow in the anti-icing flow conduit 40 has a pressure of at most 30 psia or from 20 psia to 30 psia, and/or a temperature of at most 400 degrees F. In another particular embodiment which may be particularly but not exclusively suitable for use in anti-icing of composite components, the temperature of the flow in the anti-ice flow conduit 40 is at most 160 degrees F., at most 180 degrees F., or from 160 degrees F. to 180 degrees F.

It is understood that the assembly 30 may be used with any other suitable type of anti-icing system, including, but not limited to, such systems provided in flight control surfaces, engine inlets, hot air bags, etc.

In use and in a particular embodiment, the assembly 30 allows for providing an anti-icing airflow to an aircraft anti-icing system in accordance with the following. A compressed airflow is extracted from the core flow path 20 downstream at least part of the compressor section 14, for example from the combustor plenum 26. The compressed airflow is then heated, for example through heat exchange with the exhaust of the turbine section 18. Air is extracted from the bypass flow path 22 and the pressure and temperature of this air are increased by mixing with the heated compressed airflow, for example at a location adjacent the bypass flow path 22, to create the anti-icing airflow. The anti-icing airflow is then circulated away from the bypass flow path 22 to the aircraft anti-icing system 80.

As explained above, in a particular embodiment, the heated compressed airflow and the air extracted from the bypass flow path 22 are mixed in an ejector 34, where the heated compressed airflow acts as a motive fluid to drive the extraction of the air from the bypass flow path 22. The air extracted from the bypass flow path 22 forms a substantial part of the anti-icing airflow. In a particular embodiment, the air is mixed in the ejector 34 (or other mixing device(s)) with a the ratio of mass flow of air extracted from the bypass flow path 22 to the mass flow of air extracted from the core flow path 20 having a value from 0.5:1 to 2:1; the selected ratio may be based on the engine design and on the materials of the structure receiving the anti-icing airflow. In a particular embodiment, the anti-icing airflow includes more air from the bypass flow than from the heated compressed flow.

When the anti-icing requirements are reduced, a part or the whole of the anti-icing airflow can be recirculated to the bypass flow path 22, and/or the compressed airflow can be modulated with the valve 70 of the compressed flow conduit 36, if present.

In a particular embodiment, the assembly 30 allows for an increased anti-icing airflow as compared to prior systems using air from the cabin bleed air system as the main source for anti-icing. Since the flow extracted from the core flow is significantly smaller than in a system where the core flow (cabin bleed) is used as the main air source, the bleed from the core flow path 20 is reduced, which may allow for the engine 10 to be more effectively sized for given cabin bleed air requirements—i.e. a smaller engine may be used for a same sized aircraft, as compared to an engine sized to use air diverted from the cabin bleed air system as the main source for anti-icing. For example, in a particular embodiment, the engine with the assembly 30 may provide an anti-icing airflow of about 145% that of a same size engine using air from the cabin bleed air system as the main source for anti-icing.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method for providing an anti-icing airflow to an aircraft anti-icing system, the method comprising:
   extracting a compressed airflow from a core flow path of a turbofan engine;

heating the compressed airflow to provide a heated compressed airflow;

mixing the heated compressed airflow with air extracted from a bypass flow path of the turbofan engine to create the anti-icing airflow, the anti-icing airflow having a higher temperature and pressure than that of the air extracted from the bypass flow path, wherein the heated compressed airflow is used as a motive flow to extract the air from the bypass flow path; and circulating the anti-icing airflow away from the bypass flow path to the aircraft anti-icing system.

2. The method as defined in claim 1, wherein mixing the heated compressed airflow with the air extracted from the bypass flow path is performed at a location adjacent the bypass flow path.

3. The method as defined in claim 1, wherein the anti-icing airflow includes more air from the bypass flow path than from the core flow path.

4. The method as defined in claim 1, wherein mixing the heated compressed airflow with the air extracted from the bypass flow path is performed with a ratio of a mass flow of air extracted from the bypass flow path to a mass flow of the heated compressed airflow having a value from 0.5:1 to 2:1.

5. The method as defined in claim 1, wherein the heated compressed airflow and the air extracted from the bypass flow path are mixed in an ejector.

6. The method as defined in claim 1, wherein the compressed airflow is extracted from a combustor plenum of the turbofan engine.

7. The method as defined in claim 1, wherein the compressed airflow is heated through heat exchange with an exhaust of a turbine section of the turbofan engine.

8. The method as defined in claim 1, wherein the anti-icing airflow has a pressure of 20 psia to 30 psia.

9. An assembly for providing an anti-icing airflow to an aircraft anti-icing system, the assembly located at least in part inside a turbofan engine, the assembly comprising:
a heat exchanger including an inlet, an outlet and a fluid path between the inlet and outlet, the fluid path in heat exchange relationship with a heat source;
a flow mixing device having first and second inlets in fluid communication with a same outlet, the first inlet received in a bypass flow path of the turbofan engine;
a first conduit providing fluid communication between the inlet of the heat exchanger and a compressed air portion of a core flow path of the turbofan engine;
a second conduit providing fluid communication between the outlet of the heat exchanger and the second inlet of the flow mixing device; and
a third conduit in fluid communication with the outlet of the flow mixing device for providing the anti-icing airflow to an aircraft anti-icing system.

10. The assembly as defined in claim 9, wherein the heat source of the heat exchanger is an exhaust duct of a turbine section of the turbofan engine, the fluid path including a conduit in heat exchange relationship with the exhaust duct.

11. The assembly as defined in claim 9, wherein the flow mixing device is an ejector, the first inlet defining a main inlet, the second inlet defining a motive flow inlet in use providing a motive flow driving flow through the main inlet.

12. The assembly as defined in claim 9, further comprising a valve regulating a flow through the third conduit, the valve located downstream of the flow mixing device, the fluid communication from the compressed air portion of a core flow path to the flow mixing device remaining open when the valve is closed.

13. A turbofan engine for an aircraft, the turbofan engine comprising:
a core flow path and an annular bypass flow path defined around the core flow path;
a combustor plenum containing a combustor, the combustor plenum in fluid communication with a downstream end of a compressor section of the core flow path;
a heat exchanger including an inlet, an outlet and a fluid path between the inlet and outlet, the fluid path in heat exchange relationship with a heat source;
a flow mixing device having first and second inlets in fluid communication with a same outlet, the first inlet in fluid communication with the annular bypass flow path;
a first conduit providing fluid communication between the combustor plenum and the inlet of the heat exchanger;
a second conduit providing fluid communication between the outlet of the heat exchanger and the second inlet of the flow mixing device; and
a third conduit in fluid communication with the outlet of the flow mixing device for circulating a flow from the flow mixing device to an anti-icing system of the aircraft.

14. The engine as defined in claim 13, wherein the heat source of the heat exchanger is an exhaust duct of a turbine section of the engine, the fluid path including a conduit in heat exchange relationship with the exhaust duct.

15. The engine as defined in claim 13, wherein the flow mixing device is an ejector, the first inlet received in the bypass flow path and defining a main inlet, the second inlet defining a motive flow inlet in use providing a motive flow driving flow through the main inlet.

16. The engine as defined in claim 13, further comprising a valve regulating a flow through the third conduit.

17. The engine as defined in claim 13, wherein a relative size of the core flow path and of the bypass flow path defines a bypass ratio of 4 or less.

18. The engine as defined in claim 13, wherein a relative size of the core flow path and of the bypass flow path defines a bypass ratio of at least 1.35 and at most 1.7.

19. A method for providing an anti-icing airflow to an aircraft anti-icing system, the method comprising:
extracting a compressed airflow from a combustor plenum of a turbofan engine;
heating the compressed airflow to provide a heated compressed airflow;
mixing the heated compressed airflow with air extracted from a bypass flow path of the turbofan engine to create the anti-icing airflow, the anti-icing airflow having a higher temperature and pressure than that of the air extracted from the bypass flow path; and
circulating the anti-icing airflow away from the bypass flow path to the aircraft anti-icing system.

20. A method for providing an anti-icing airflow to an aircraft anti-icing system, the method comprising:
extracting a compressed airflow from a core flow path of a turbofan engine;
heating the compressed airflow through heat exchange with an exhaust of a turbine section of the turbofan engine to provide a heated compressed airflow;
mixing the heated compressed airflow with air extracted from a bypass flow path of the turbofan engine to create the anti-icing airflow, the anti-icing airflow having a higher temperature and pressure than that of the air extracted from the bypass flow path; and circulating the anti-icing airflow away from the bypass flow path to the aircraft anti-icing system.

* * * * *